United States Patent
Pelc, Jr.

(10) Patent No.: US 8,464,488 B2
(45) Date of Patent: Jun. 18, 2013

(54) ANCHORING DEVICE (75) Inventor: Robert J. Pelc, Jr., Bradenton, FL (US)

(73) Assignee: The Ipe Clip Fastener Co., LLC, Bradenton, FL (US)

( * ) Notice: Subject to any disclaimer, the term of this patent is extended or adjusted under 35 U.S.C. 154(b) by 68 days.

(21) Appl. No.: 13/090,808

(22) Filed: Apr. 20, 2011

(65) Prior Publication Data

US 2011/0192112 A1 Aug. 11, 2011

Related U.S. Application Data (63) Continuation-in-part of application No. 10/956,873, filed on Oct. 1, 2004, now abandoned.

(51) Int. Cl.
*E04B 2/00* (2006.01)
*E04F 15/22* (2006.01)
*F16B 7/00* (2006.01)
*F16D 1/00* (2006.01)

(52) U.S. Cl.
USPC ....... 52/586.1; 52/403.1; 52/586.2; 52/591.5; 403/231; 403/294; 403/408.1

(58) Field of Classification Search
USPC ............... 52/698, 489.1, 489.2, 650.3, 586.1, 52/586.2, 585.1, 483.1, 403.1, 591.1, 591.4, 52/591.5; 403/408.1, 292, 293, 294, 286, 403/231, 232.2, 397; 411/461, 125
See application file for complete search history.

(56) References Cited

U.S. PATENT DOCUMENTS

| | | | | |
|---|---|---|---|---|
| 3,613,495 A * | 10/1971 | Podgursky | ..................... | 411/19 |
| 4,821,934 A * | 4/1989 | Alessi et al. | .................. | 224/667 |
| 5,660,016 A * | 8/1997 | Erwin et al. | ................. | 52/483.1 |
| 6,402,415 B1 * | 6/2002 | Eberle, III | ..................... | 403/231 |
| 6,810,633 B2 * | 11/2004 | Harris, Sr. | ..................... | 52/489.2 |
| 6,851,884 B2 * | 2/2005 | Eberle | ............................ | 403/231 |
| 7,052,200 B2 * | 5/2006 | Harris | ............................ | 403/231 |
| 7,578,105 B2 * | 8/2009 | Eberle, III | ................. | 52/403.1 |
| 7,984,599 B2 * | 7/2011 | Snell et al. | .................... | 52/586.1 |
| 2002/0121064 A1* | 9/2002 | Erwin | ........................... | 52/586.1 |
| 2004/0020152 A1* | 2/2004 | Harris, Sr. | .................... | 52/582.1 |
| 2004/0184878 A1* | 9/2004 | Eberle, III | ................. | 403/408.1 |
| 2005/0063771 A1* | 3/2005 | Harris | ........................... | 403/294 |
| 2006/0059822 A1 | 3/2006 | Guffey | | |
| 2006/0107612 A1* | 5/2006 | Pelc | ............................... | 52/698 |
| 2011/0192112 A1* | 8/2011 | Pelc, Jr. | ......................... | 52/705 |

* cited by examiner

*Primary Examiner* — Andrew Triggs
(74) *Attorney, Agent, or Firm* — Patricia M. Costanzo (57) ABSTRACT

An anchoring device is disclosed comprising a generally horizontal top element made of a resilient material embedded with a high-strength material and being of varying thicknesses throughout and having a generally downward extending element of a variety of shapes extending downwardly from the underside thereof. The high-strength material may be of any high-strength material, such as metal, rigid high-strength plastic, or fiberglass, for example and may be embedded as a solid or as particulate material. When used as a particulate, the high-strength material may be embedded in select areas as required to customize the anchor. Where desired, the generally downwardly extending element may also comprise a high-strength material of either solid or particulate form.

20 Claims, 9 Drawing Sheets

ANCHORING DEVICE

CROSS-REFERENCE TO RELATED APPLICATIONS

This Continuation-in-Part Application claims the benefit of application Ser. No. 10/956,873 filed on Oct. 1, 2004.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates to an anchoring device for retaining adjacent boards in precision spaced alignment, being particularly suitable for use with outdoor platform deck construction.

The background information discussed below is presented to better illustrate the novelty and usefulness of the present invention. This background information is not admitted prior art.

Outdoor spaced board platforms, generally referred to as decks, have become popular additions to homes, offices, restaurants, and the like. They generally comprise a plurality of elongate, flat laid, closely spaced boards, connected to and supported on their bottom surfaces by framing with spaced joists, stringers, beams, and the like forming a secure floor. Though the boards are generally cut from natural wood, they have been increasing manufactured from various compositions of wood and/or other cellulosic materials with various resins, and even plastics and various metals. The top surface of the boards is generally referred to as the face side of the board and the facing elongate sides of adjacent flat laid boards is generally referred to as the edges of the board.

It is desirable from an ornamental standpoint to maintain the spacing of the edges of the flat laid floor boards at a consistent distance. This distance between adjacent floor boards is generally minimized for safe walking and standing especially for those wearing high heels or those walking with bare feet. At the same time, the minimum distance must also provide for water drainage from the floor and for expansion, contraction swelling or the like of the boards without engagement of adjacent boards.

It is also generally a desirable ornamental design to connect the flat laid floor boards to framing and/or stringers unobtrusively, without visible nail or screw heads showing on the face surface of the boards, and to provide an anchoring means that resists the warping of adjacent boards, particularly warping that is a continuous problem between connection points to joists, stringers and the like.

Various fastening devices have been proposed in an attempt to provide desirable ornamental design characteristics to flat laid boards yet each have serious shortcomings which mitigate against their use.

SUMMARY

Applicant herein introduces inventive principles to provide for an anchor device possessing a high degree of both strength and supple resiliency and a design that keeps the device out of sight, once installed. The strength of the device provides for a long-lived device. The structural integrity of the device is not comprised by weather related stresses, such as rapid and even extreme changes of temperatures or by long periods of freezing. Neither does the device suffer from the pressures and stresses of regular use of the floor that was created by flooring boards attached to supporting joists using the anchor device. It is expected that decking boards will expand, contract, and shift as a result of environmental changes, such as freeze and thaw, or dry and wet cycles, but the combination of high-strength and a high degree of resiliency keeps the device in functioning condition, regardless. Additionally, because the anchor has a strength component that is as strong, or stronger, than the decking boards, once in position, the anchors help to prevent the boards from warping and its high strength also protects the device from damage that is often caused by over-tightening of the screws or nails used to attach the anchors to the joists. In fact, because this type of damage is so prevalent, to avoid damage from over-tightening using known anchors, many installers deliberately fasten the screw or nail loosely which can lead to a failed attachment. Using the anchor made according to the principles of the present invention, installers no longer need to deliberately loosely fasten a screw or nail means. Thus, the strength of the device protects the device against such pressures and stresses, while the resiliency of the device serves in part to protect the boards from being offset or damaged as they expand and contract. Accordingly, Applicant's inventive principle requires anchor devices to be constructed from both a combination of resilient plastic and a high strength material. There are several methods that may be used to embed the high strength material within the resilient plastic device to provide a functioning combination of high strength and resiliency to provide an anchor that can securely and sustainably attach decking floor boards to supporting joists while assuring that a desired spaced relationship is maintained between the boards. The various methods of making anchor devices according to the present inventive principles will be discussed below and in the Detailed Description Section.

A high-strength metal reinforced resilient plastic anchor for joining adjacent flat laid boards that provides both malleability and strength is one example of the claimed device. This anchor device comprises a generally horizontal, resilient plastic top element which is the metal reinforced part and extending downwardly from the underside thereof is a generally downward extending guide element. In this example, a high-strength material in the form of a metal plate is introduced into the resilient plastic as the anchor device is molded, although alternatively, the plastic anchor device may be molded with a slit in it and a metal, or other high-strength material, plate may be inserted into the slit once the anchor device is molded. The top element has a fastening opening therein which passes through the metal reinforcing plate and is arranged to accept a screw or nail means for fastening the anchoring device to a joist or adjacent flat laid board. The top element of this example of an anchor device of the inventive concept of the present invention is in the form of a generally flat plate of measured thickness generally corresponding to about the width of a joining slot in the edge of a flat laid board in which it is to be inserted. The generally flat plate can be described as a thick plate consisting of two halves or flanges. To use this anchor device, a first board is laid over, and if desired, attached to a supporting joist. Such decking boards are generally supplied with precut side-spaced biscuit-joiner slot that is at a specific distance from the top and bottom surface. A flange of one of the devices is inserted into the precut slot and a screw or nail may then be inserted into the fastening aperture provided therethrough for fastening the board, via the device, to the supporting joist. The other flange of the device, that is the side of the top element that is protruding from the slot of the first laid board, is then inserted into the accepting slot of a second board as the second board is placed into position on the supporting joist next to, but spaced from, the first board. The anchor assures that a specific gap will be maintained between the boards to allow for drainage and to provide differential movement space when, for example, the boards swell from heat and moisture. The device, as is readily apparent, is not a screw or a nail, but it can accept a nail or screw into an accepting aperture that is provided. To provide for the secure spaced attachment of the decking boards to the joists the device must have strength, such as the strength of steel. The device must also be strong enough to maintain the screw or nail that is positioned through the accepting aperture in its desired position without the screw or nail damaging the device as various stresses are placed on the floor boards, and thus on the device, during regular use. Thus, the thickness of the high-strength material, and the fastener opening therethrough, are sized to provide a maximum amount of resistance to the passage of the head of a screw or nail fastening means therethrough. To provide for expansion and contraction of the floor boards after they have been securely attached to the supporting joists, the device is manufactured with plastic having the required properties of flexibility and resiliency.

In another embodiment, the top surface of the top element has a generally flat peripheral area with a central area sloping downwardly toward a central opening. In a still further embodiment, the top side of the top element comprises an upwardly extending shoulder arranged to extend over the fastening opening and conceal the opening from direct overhead view. The side of the shoulder comprises an opening sized and aligned to enable passage of a screw or nail through the opening of the horizontal element for attaching the device to a joist or flat laid board. The shoulder may be dimensioned to any suitable width, but it is generally desirable to be of the same or less width than the width of the downward extending element. In an embodiment where in the shoulder width is the same as the width of the downward extending element, it is generally desirable that the shoulder comprise a hollow and that the walls of the hollow are dimensioned in thickness to be collapsible.

When viewed from a top plan view, the horizontal top element can be generally circular, oblong, elliptical, polygonal or the like, and can be of any convenient thickness. Generally, it is preferred that a metal plate sandwiched therein be of a similar shape. Thus, in preferred embodiments a generally circular horizontal element preferably comprises a generally circular metallic plate; a generally oblong element comprises a generally oblong plate and polygonal element a generally polygonal plate. Generally it is preferred that plastic fully surround the metal plate, that is the metal plate should be embedded in the plastic so that the metal plate is surrounded by plastic on its top, bottom, and peripheral edge, but such is not required. In one embodiment, a metal plate rests in a conforming seat of plastic around its peripheral edge and bottom surface. In another, only a portion of the top surface of a metal plate is covered.

The elongate downward extending element is formed in continuum with plastic comprising the horizontal top element and serves several functions. The downward extending element serves as a attachment guide for assuring the top element is fixed at about a right angle to the edge of the flat laid board it is fastened to, while its depth provides a measured distance between the edges of adjoining boards for consistent ornamental design, as well as to provide for any needed drainage and for expansion of the boards. The downward extending element also serves to as a nail or screw cover, keeping whatever attachment means is used separate from the boards. A high-strength material may also be added to the downward extending element while it is being manufactured.

In one embodiment the downward extending element is a collapsible element comprising a hollow and the walls forming the hollow of the downward extending element are sized in thickness and strength to collapse and/or break upon excessive compression of the element through swelling of adjacent flat laid boards. In such embodiments, wherein the plastic is flexible, the downward extending element collapses. In such embodiment wherein the plastic is stronger the downward extending element is formed thin walled to enable it to break under the force of swelling adjacent boards. In other embodiments, used particularly with rigid plastics, the end of a generally hollow downward extending element at the underside of the top element is dimensioned thinner to shear under a measured force.

In a preferred embodiment, the hollow of the downward extending collapsible element has an opening at its end distal from the horizontal element. In a further preferred embodiment, the end of the downward extending collapsible element, nearest the horizontal top element, further comprises one or more outlet openings along one or more of its engaging surfaces in alignment with the fastening opening of the top element, so that a fastening screw or nail means can be angularly directed through the fastening opening of the top element through a side of the collapsible element.

One or more generally downward extending elements of any suitable curved or polygonal shape extends downwardly from the underside of generally horizontal top element. In one embodiment, the downward extending collapsible element is a hollow polygonal box comprising an opening at its distal end. In a further embodiment, the downward extending collapsible element comprises adjacent hollow rectilinear boxes arranged on opposite sides of a central opening along a common centerline with an opening at their distal ends. Downwardly extending collapsible element(s) are generally of cylindrical, elliptical, oblong, spheroidal, or the like cross-section, with an open distal end. Downward extending spheroidal elements, especially those to which a high-strength material has been added have that extra width and strength that is needed to contribute to the anchor's ability to keep the boards spaced at the desired distance and direction. There may be times when the diameter of the spheroidal element would be too large for the desired spacing but reducing the diameter of the spheroidal element would decrease its height and that would reduce the height of the top element that is supported by the spheroidal element, thus, when the diameter of the spheroidal element must be reduced a support leg is positioned beneath the spheroidal element to increase the height of the top element.

In a still further embodiment of the invention, the downward extending element comprises a tab arrangement which is displaced when subjected to force occasioned by swelling and the like of adjacent flat laid boards. An assembly tab(s), connected to the underside of the top element and/or to the downward extending element, is spaced from the downward extending element, and has an installation surface facing opposite from an edge mounting surface of the downward extending element. The assembly tab(s) is arranged to displace from position when subjected to the excessive pressure of swelling, but to resist displacement during deck assembly. In a preferred embodiment, the downward extending element is arranged offset from a centerline of the generally horizontal member and is dimensioned to a thickness less than the desired assembly distance between laid boards. The surface of the downward extending element which is the most offset from the centerline of the horizontal element, comprises the edge mounting surface of the downward extending element, and is arranged so that the distance from the edge mounting surface of the downward extending element and the installation surface of one or more tabs comprises the desired ornamental assembly distance between laid boards. Thus, during installation the anchors are screw or nail fastened with the mounting surface of the downward extending members engaging the first laid board and the second laid board is inserted into position with its adjacent edge engaging the installation surface of the tabs. Upon swelling of the boards, the assembly tabs are displaced by breaking off or bending in response to the decreasing distance between flat laid boards.

The opening in the horizontal top element is provided to enable screwing, nailing or the like the anchor device to a joist or an adjacent flat laid floor board. An opening can be of any suitable shape. In one embodiment the opening is generally circular. In a further embodiment the opening is oblong. In a still further embodiment the opening is polygonal. In one embodiment the opening is generally central to the top element. In a further embodiment the opening is generally offset from the center of the top element.

In other examples, discussed in more detail below, the high-strength material added to the resilient plastic is a particulate form of metal, such as chips, shavings, or the like. In yet other examples, the high-strength material is other than metal, such as rigid plastics and fiber glass, for example. In these examples, the rigid plastic or fiber glass can be in plate form or in particulate form. The small particles of high-strength material can be either uniformly dispersed or positioned within the plastic, such as during the plastic's molding process, as the final use dictates. The use of particulates is especially important when the usefulness of the anchor device can be substantially enhanced by manufacturing the device so that its high-strength sections are discreetly positioned to be exactly where required. For example, if the edge of a circular plate of an anchor is required to be resilient while its central area requires strength, the particles of high-strength material can be concentrated in the central area. Similar function or design needs can be met using solid metal, fiber-glass, or the like, by either shaping the solid or customizing its thickness or both.

In still another embodiment, the surfaces of the top element provide increased friction or resistance between the top, bottom, and/or side surfaces of the anchor and the surfaces of the slot to further assure that the anchors remain firmly in place. Known anchors are known to move under stress, which among other deleterious effects, cause the spacing between the boards to change, presenting an unattractive positioning of the boards. The inventive concept, as taught herein, offers several ways to increase the friction or grabbing power of the top element of the anchor. Greater friction or resistive properties can be produced in the top and/or bottom surfaces of the top element by changing the shape of the surface. For example, the otherwise planar top or bottom surface can be molded to be convex or concave producing areas of greater and lesser thicknesses of the body of the top element. Having an anchor made of a resilient plastic with areas of greater and lesser thicknesses makes this anchor work in many instances where more rigid anchors (made of any other rigid material, such as rigid plastic or metal) are prone to failure. For example, when the material of the deck boards contracts, the slot spaces can increase, and the resilient areas of greater thickness will expand to fill the increased space. Alternatively, when the decking is grooved into "wet" boards and dries during the time it takes to be milled, stored, and delivered to a jobsite the slot space can shrink. Because the areas of greater and lesser thicknesses are made according to the principles of the invention, which require a resilient material, the greater thickness areas will easily compress to fit into such narrow slots. One embodiment has a slight raised ridge along the outer side of the top element to make sure the hold-down force of the device is as deep in the groove as possible to help keep the boards from cupping as no slot is machined perfectly flat. In any of the cases where the slot size increases, the anchor areas of greater thickness will remain in contact with the surfaces of the slot to create a resistance between the board and the anchor to keep both the board and the anchor in place and will do so without damaging the boards. The resilient plastic will not, cannot, cut into, or in any other way, damage the deck board. Known anchors made of metal, that by the property of metal means the anchors are rigid, are not able to accommodate any slot that was cut on a short tolerance, and instead of creating an increased friction surface will damage the surfaces of the slot. Another attribute of the resilient plastic is that when pressure is applied to the edge of the deck boards, such as when they are stepped on, the areas of greater thickness can supply the support that was removed when the slot was incised into the board and, again because it is a softer material does so while preventing the wood above the slot from cracking. While the resilient top element of the claimed invention is can be inserted into a slot with ease, known anchors of metal or rigid plastic must be pounded into "tight" slots or discarded. When installers try to force such rigid devices into a slot, the wood becomes stressed and can split.

Another way the present invention provides for surfaces with greater frictional or resistance properties is to provide the surfaces with protuberances extending out from the surface. The protuberances take different forms, as they can be spike, squared, or rounded shaped for example. It is to be understood that the protuberances may be found on any of surfaces of the top element, which includes the top, bottom, and side surfaces. Where the protuberances are to be located is decided by the requirements of each job. Because the protuberances are made of resilient plastic, they will not cut into, or in any other way, damage the deck board. There are anchors made of metal that could have metal ridges, but metal ridges are sharp and extremely rigid and, thus, could not be accommodated by any slot that was cut on a short tolerance, and instead of creating an increased friction surface contact between the surfaces of the slots and the anchor, anchors with such hard, rigid sharp protuberances could cut into the board and create weak spots. Another attribute of protuberances of resilient plastic is that when pressure is applied to the edge of the deck boards, such as when they are stepped on, the protuberances of the anchor supply the support that was removed when the slot was incised into the board and also help to prevent the wood above the slot from cracking. The only protuberances that can work in all of these cases are protuberances that are made of a resilient plastic because they will bend or compress when stressed and will retain their original shape when the stress is removed.

For a fuller understanding of the device of the present invention, reference should be made to the following detailed description taken in connection with the accompanying drawings. Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

REFERENCE CHARACTERS AND PARTS TO WHICH THEY REFER

10 Top element.
11 Embedded high-strength material.
12 Fastening aperture.
20 Top element.
21 Embedded high-strength material.
22 Fastening aperture.
23 Ridge.
23a Ridge.
30 Top element.
31 Embedded high-strength material.
32 Fastening aperture.
32a Fastening aperture.
33 Shoulder extending upward.
34 Downward extending element extending downward.
40 Top element.
41 Embedded high-strength material.
42 Fastening aperture.
43 Fastening aperture.
44 Hollow cylindrical rectilinear element
45 Fastener.
50 Top element.
51 Embedded high-strength material.
52 Fastening aperture.
60 Top element.
61 Embedded high-strength material.
62 Fastening aperture.
63 Shoulder.
64 Hollow downward extending rectilinear element.
65 Hollow downward extending rectilinear element.
70 Top element.
70a Underside of top element.
71 Embedded high-strength material.
72 Fastening aperture.
74 Solid rectilinear element.
75 Solid rectilinear element.
76 Assembly tab.
76a Shear line.
77 Assembly tab.
77a Shear line.
80 Anchor assembly.
81 Top element.
82 High-strength material.
83 Protuberance(s).
84 Downward extending element extending downward.
85 Lower surface of top element.
85a Top surface of element 80 depressed inwardly.
85b Bottom surface of element 80 depressed inwardly.
90 Anchor assembly.
91 Fastening aperture.
92 High-strength material.
94 Spheroidal element extending downward from and supporting top element 91.
95 Top element.
98 Base support for spheroidal element.

DEFINITIONS

High-strength material, as used herein, refers to any material, in solid or particulate form, that provides the strength that is required to withstand the pressures of installed decking boards and the additional pressure and stresses due to the expansion and contraction of the board as a result of environmental changes, such as cycles of hot/cold and warm/dry, as well as the pressure produced by use of the decking boards, such as when used as flooring.

Protuberance, as used herein, refers to something, such as a bulge, knob, or swelling that protrudes from the surface under consideration, where the surfaces are the top, bottom, and side surfaces of the top element. According to the inventive concept the protuberances protrude from the surfaces of the top element only to the extent that the entire top element can be fitted into the slot precut into the sides of decking or flooring boards. Thus, the height of the protuberances is determined by the height of the slot and the resiliency of the protuberances.

Resilience is the physical property of material that allows the material to be repeatedly stretched or deformed and to resume its shape after being so stretched or deformed (elasticity).

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms, examples of which are given below. Therefore, the embodiments described herein are provided with the understanding that the present disclosure is intended as illustrative and is not intended to limit the invention to the embodiments described herein.

The present invention is directed towards an anchoring means that provides both high-strength and great resiliency. The high-strength gives the anchor the ability to withstand the pressure exerted upon it by the boards it is anchoring. Thus, the anchor will not split or bend, and is so doing helps to keep the boards from buckling and bending as they undergo the affects of varying temperatures and humidity. Moreover, the high-strength of the anchor keeps the anchor from defects that might otherwise be caused by the metal fasteners that fasten the anchor to the board supports. The resiliency of the anchor provides the tolerance required to accommodate the regular expansion and contraction of the boards caused by cycles of freeze/melt, wet/dry, and warm/cold. To achieve all of these advantages, the anchor is made from resilient plastic that is impregnated with a high-strength material. The high-strength material can be a solid or can be particulate matter that can be positioned within the anchor to provide required areas of high-strength next to required areas of resiliency. The anchors are able to compensate for the tolerances of the pre-cut slots in the decking boards by having a top element of varying thicknesses. These specialty formed surfaces may be uniformly thicker in some portions, such as being thicker about the periphery or they may be manufacture to be thicker in a patterned effect.

Although several variations will be described below, in general an anchor consists of a "top element" which may be described as having a first part and a second part, where each part is half of the top element. These parts will be referred to as flanges, as it is the flanges that will be inserted into the "biscuit" type slot that is pre-cut into the sides of decking boards. Extending from the bottom of the top element is an element with a hollow area. An aperture for receiving a fastener for fastening the anchor to one of the supports supporting the deck flooring boards is position through the top and downward extending element. Within the elements, especially within the top element, there is embedded a high-strength material, such as a metal plate, metal particulate matter, or other rigid high-strength material that is either platy or particulate, such as fiber glass or high-strength rigid plastic for example. The top and/or bottom surfaces may exhibit varying degrees of thicknesses to compensate for low tolerance in the cut of the slot, to provide support for the thinned edges of the boards, to prevent buckling and cracking of the boards. The high-strength material component provides similar benefits in protecting the integrity of the anchor against, for example, over-tightening of the fastener by installers, or from the pressures and stresses of the boards as they react to changes in their environment.

Figure 1:
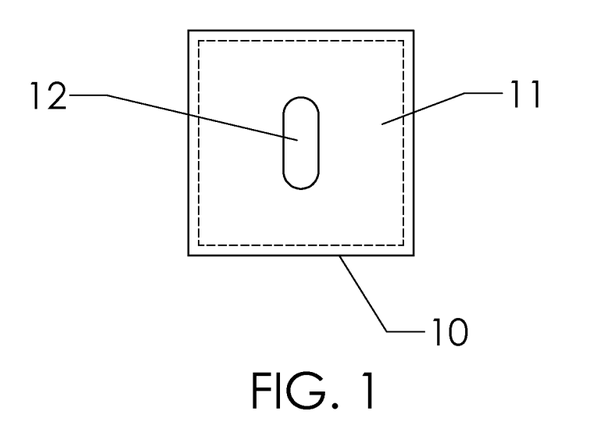
FIG. 1 is a top plan view of an anchoring device of the invention showing the geometric shape of the embedded high-strength material by the dotted line.
Figure 2:
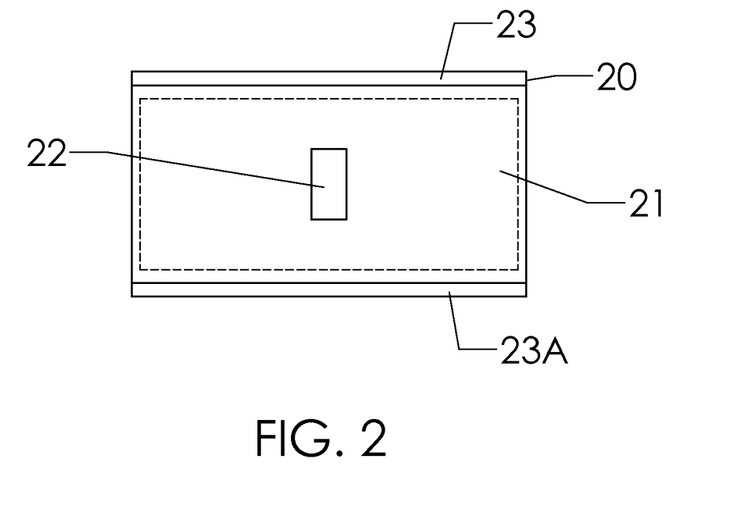
FIG. 2 is a top plan view of another anchoring device of the invention showing the geometric shape of the embedded high-strength material by the dotted line.
Figure 3:
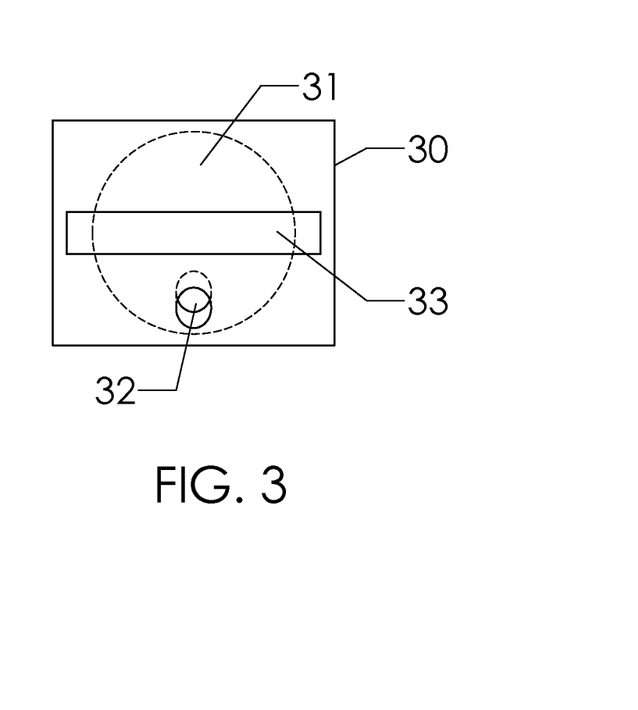
FIG. 3 is a top plan view of another anchoring device of the invention showing the geometric shape of the embedded high-strength material by the dotted line.
Figure 4:
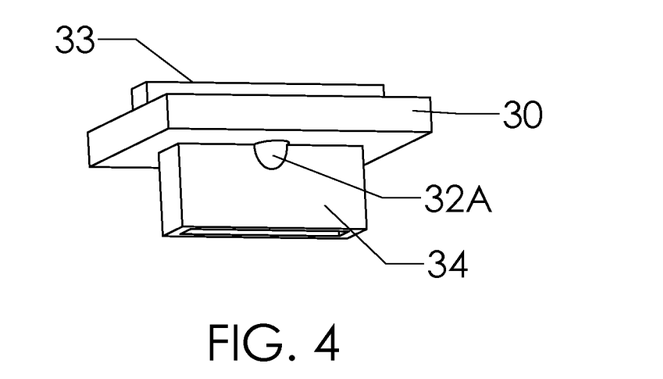
FIG. 4 is a perspective view of the anchoring device of FIG. 3.

Referring now to FIGS. 1-4, FIG. 1 illustrates a top plan view of one example of an embodiment of the anchoring device of the invention having a generally square top element 10, with embedded high-strength material 11 indicated by the dotted line. In this case embedded high-strength material 11 also is generally square. Embedded high-strength material 11 could be a plate of high-strength material, such as a metal plate or a plate of fiberglass or high-strength plastic, for example, or the embedded high-strength material 11 could be a particulate form of any high-strength material. This choice of materials holds true for all the examples given unless stated otherwise and, thus, will not be repeated for every example. Top element 10 has oblong fastening opening 12 therethrough, though it is to be understood that the fastening openings may be of any required shape. This example of the inventive principles is meant to have resilient plastic surrounding the sides and exterior peripheral edges of embedded high-strength material 11, with the embedded high-strength material at the generally central aperture not being covered by plastic. FIG. 2 illustrates a top plan view of an embodiment of the anchoring device of the invention having a generally rectangular top element 20 and embedded high-strength material 21 indicated by the dotted line as also being generally rectangular and having a rectangular fastening opening 22 therethrough. This embodiment also shows the top element comprising one or more ridges, 23 and 23a along its top, but that could be and/or on the underside, as well. In a still further embodiment example, as illustrated in FIGS. 3 and 4, the anchoring device comprises upwardly extending shoulder 33 arranged on the top side of top element 30, with embedded high-strength material 31 being generally circular as indicated by the dotted line, and a circular fastening aperture 32 extending from the top side of top element 30 to the bottom side (see 32a in FIG. 4). The upwardly extending shoulder may be dimensioned to any suitable width, but it's generally desirable to be of the same or less width than the width of hollow rectilinear downward extending element 34 which, as illustrated in FIG. 4, extends vertically downwardly from the bottom side of top element 34. When the shoulder width is the same as the width of the downward extending element, it is generally desirable that the shoulder be a hollow construction and that the walls of the hollow be of a thickness to be collapsible. This embodiment is generally desirable for use with flat laid boards and is particularly preferred for use with flat laid boards which undergo significant climactical dimensional changes. The offset placement of the fastening aperture allows the anchor to be fastened to the flat laid board to which it is related in a hidden manner, in that when the second board is pushed into position with regard to the earlier laid board and the anchor, the screw head is covered by being within the slot thereof.

Figure 5:
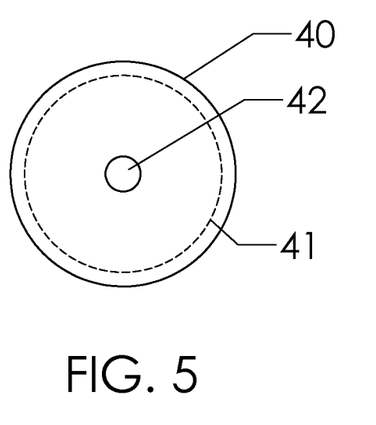
FIG. 5 is a top plan view of another anchoring device of the invention showing the geometric shape of the embedded high-strength material by the dotted line.
Figure 6:
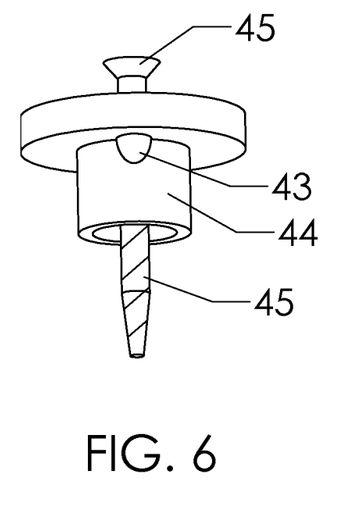
FIG. 6 is a perspective view of the anchoring device of FIG. 5 shown with attachment screw.

FIGS. 5 and 6, a top plan and bottom side perspective view, respectively, illustrate an example of the anchoring device, manufactured according to the inventive concepts as taught herein, having generally circular top element 40, with embedded high-strength material 41 being outlined in dotted line. Fastening aperture 42 is arranged about center of top element 40 and collapsible hollow cylindrical downward extending element 44 is illustrated as a cylindrical member extending downwardly from the underside thereof, with fastening screw 45 shown extending generally vertically there-through for direct attachment to a joist or the like. Alternate fastening opening outlet 43 is illustrated as extending through the side of downward extending element 44 for fastening to an adjoining flat laid board.

Figure 7:
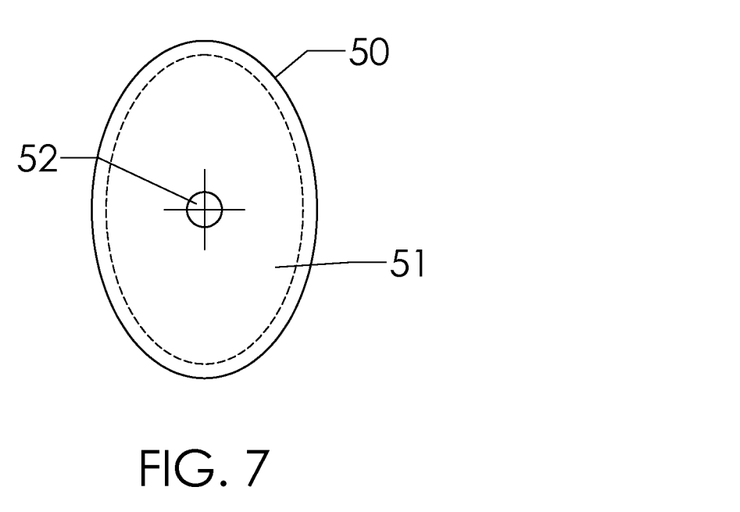
FIG. 7 is a top plan view of another anchoring device of the invention showing the geometric shape of the embedded high-strength material by the dotted line.

FIG. 7, a top plan view, illustrates an example of the anchoring device following the present inventive concept having generally oval top element 50, with embedded high-strength material 51 indicated by the dotted line, and having a generally circular fastening opening 52 there through. This embodiment is particularly preferred for use with flat laid boards in which spaced mating biscuit joiner slots are cut.

Figure 8:
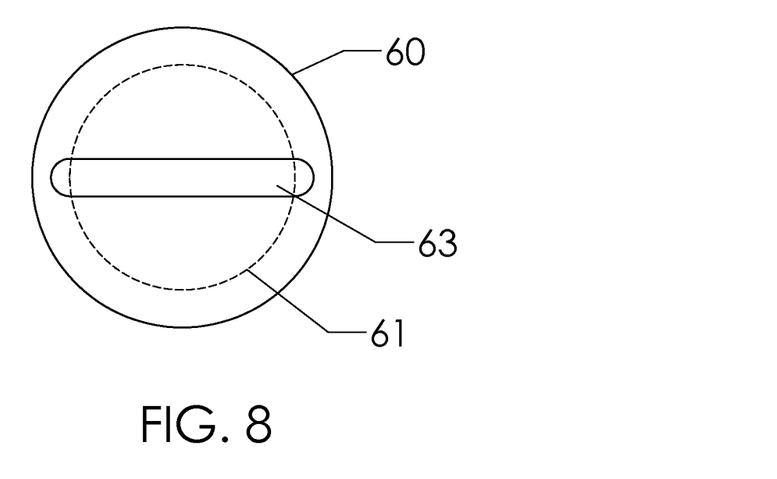
FIG. 8 is a top plan view of another anchoring device of the invention showing the geometric shape of the embedded high-strength material by the dotted line.
Figure 9:
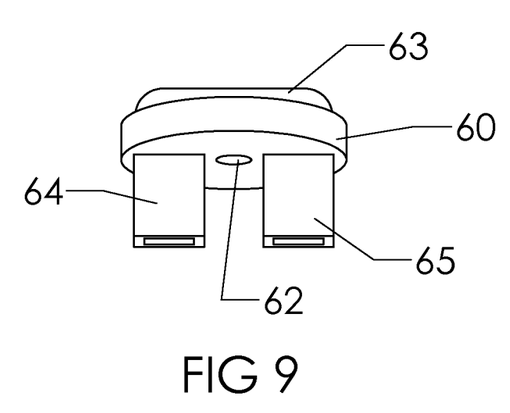
FIG. 9 is a perspective view of the anchoring device of FIG. 8.

FIGS. 8 and 9, top plan and bottom side perspective views, respectively illustrate an example anchoring device having generally circular top element 60, with embedded high-strength material 61 indicated by the dotted line. Fastening aperture 62 is arranged about center of the top element and the top element comprises shoulder 63 extending upwardly from the top side of top element 60 and collapsible hollow rectilinear downward extending elements 64 and 65 extending downwardly from the underside thereof. In this embodiment of the invention, shoulder 63 comprises an aperture (not shown) along its side at about its confluence with top element providing entrance to fastening opening 62. This side entrance to the attachment aperture hides a screw or nail head from direct top view, in a manner similar to that described above in relation to the example illustrated in FIGS. 4 and 5, and is a preferred embodiment for deck construction where visible screw heads are discouraged.

Figure 10:
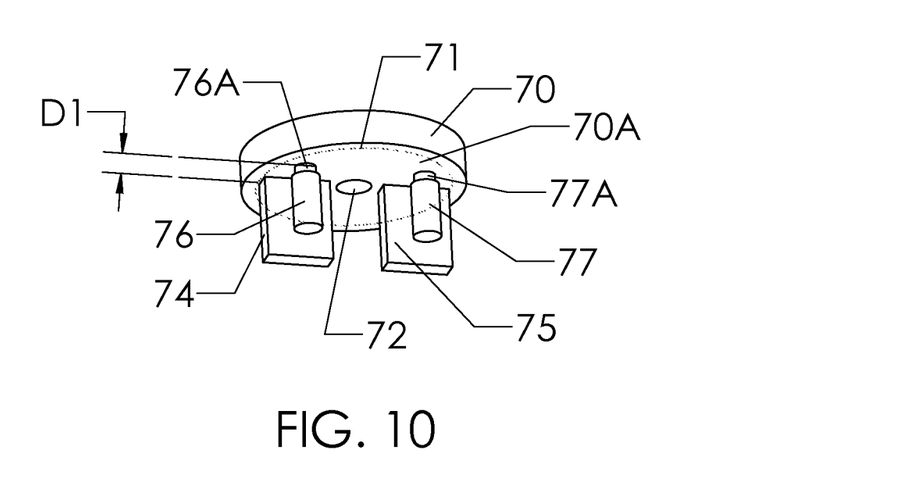
FIG. 10 is a perspective view of a further anchoring device of the invention.

FIG. 10 illustrates a bottom side perspective view of an embodiment of the anchoring device of the invention having a generally oblong top element 70, with embedded high-strength material 71 being outlined in dotted line. Fastening opening 72 is arranged about center of the top element and solid rectilinear downward extending elements 74 and b extend downwardly from the underside thereof, offset from about the centerline of top element 70. In this embodiment of the invention, assembly tabs 76 and 77 extend from the underside 70a of top element 70 and comprise reduced dimensioning shear lines 76a and 77a at their boundary with top element 70, enabled to break when subjected to a defined generally perpendicular force. Dimension d1 is sized to the desired ornamental assembly dimension between boards. It should be understood that though assembly tabs in this embodiment are illustrated as solid tabs breaking away under stress, they may be hollow tabs and the like and may be rigidly or flexibly connected to the downward extending element so as to be displaced by breaking away or bending to a different position under the force of swelling and the like generally horizontal stress.

Figure 11A:
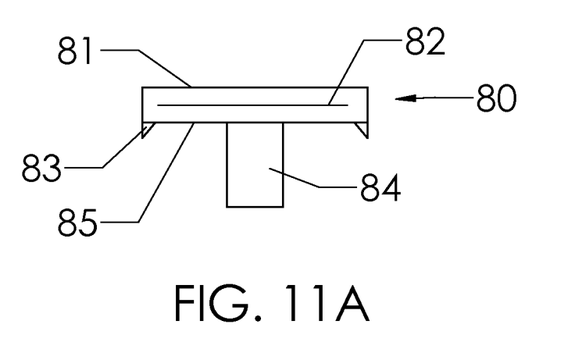
FIGS. 11A-11J are side elevation views of additional examples of anchoring devices according to the principles of the present invention.
Figure 11B:
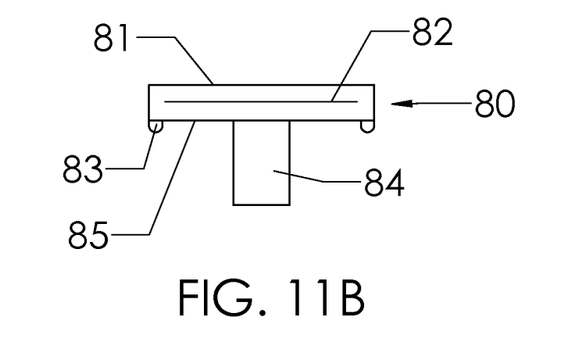
Figure 11C:
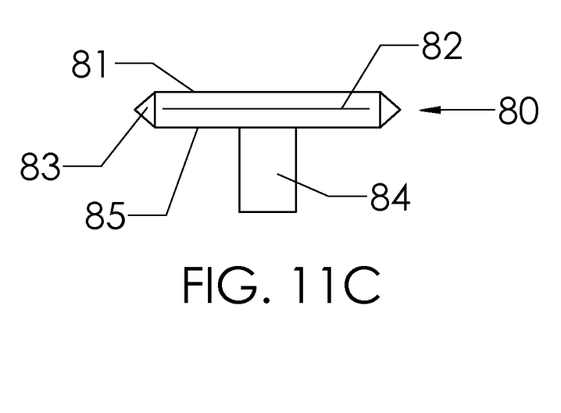
Figure 11D:
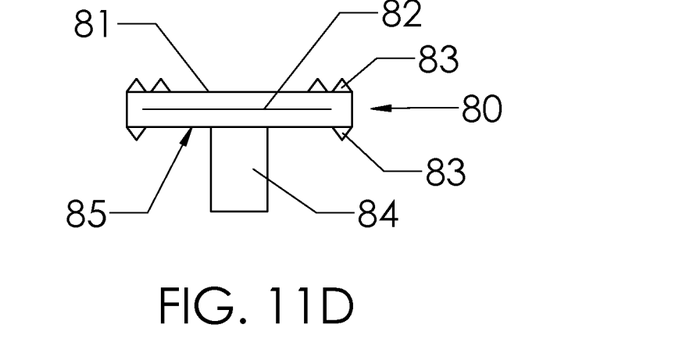

FIGS. 11A-11J, side elevational views, illustrate the various ways that top elements 81 of anchors 80 are manufactured to provide increased friction, resistance, support, and material between the top and bottom surfaces of each anchor device to assure that the anchors remain firmly in place. Known anchors have been observed to move under stress, which can cause the spacing between the boards to change, presenting an unattractive positioning of the boards, for example. The inventive concept, as taught herein, provides top element surfaces with increased friction and grabbing power by adding protuberances to either the top or the bottom surface or both (FIGS. 11A, 11B, and 11O, respectively). The protuberances may take different forms, they can be shaped to have a "pointed tip" (FIGS. 11A and 11D) or to have a more rounded shape (FIG. 11B), for example. It is to be understood that the protuberances may be found on any of surfaces of the top element, which include the top and bottom (FIG. 11D) and side surfaces (FIG. 11C). Where the protuberances are to be located is decided by the requirements of each job. Because the protuberances are made of resilient plastic, they will not cut into, or in any other way, damage the decking floor boards. There are known anchors made of metal that could have ridge lines cut into or extend from their surface, but metal ridges are extremely rigid and sharp and, thus, would damage the surface of any slot that was cut on a short tolerance. Moreover, instead of creating an increased friction surface, such hard, sharp protuberances would create weak spots in the boards by digging into them. Another advantage of having protuberances made of resilient plastic is that when pressure is applied to the edge of the deck boards, such as when they are stepped on, the protuberances supply the support that was removed when the slot was incised into the board and also help to prevent the wood above the slot from cracking. As mentioned, the slot into which an anchor is to be inserted may be as thin as or slightly thinner than the top element of the anchor. This means that known clips of metal or rigid plastic must be pounded into the slot or be discarded. However, when installers force such rigid devices into an un-accepting slot, the board material becomes stressed and can split. The only surface protuberances that can work in such instances are protuberances made of the resilient plastic required by the inventive concept because they will bend or compress when stressed and will re-attain their original shape when the stress is removed.

Figure 11E:
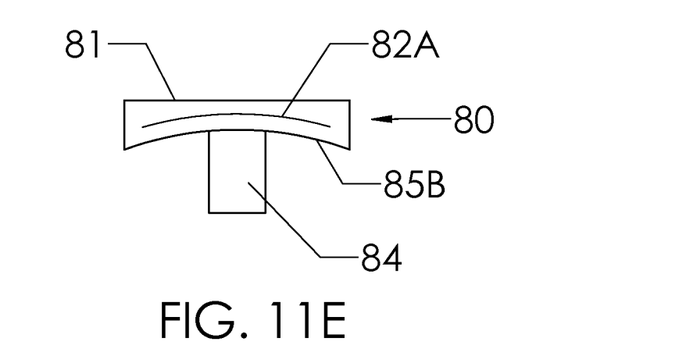
Figure 11F:
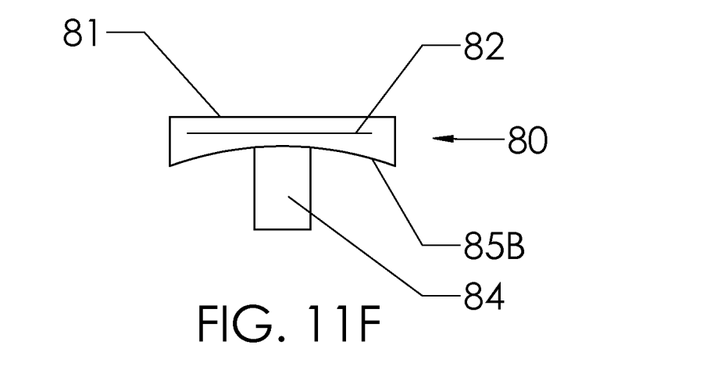
Figure 11G:
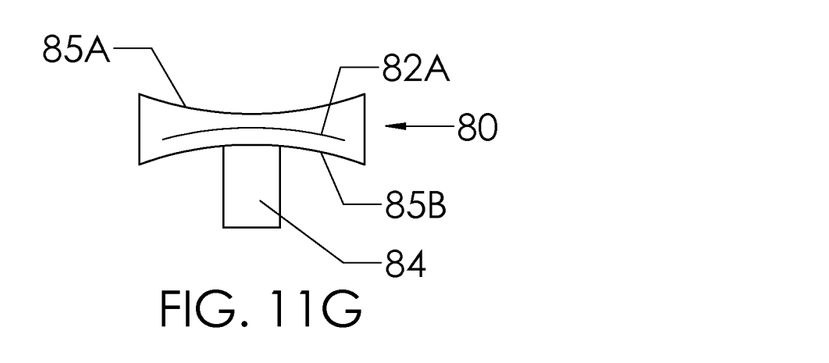
Figure 11H:
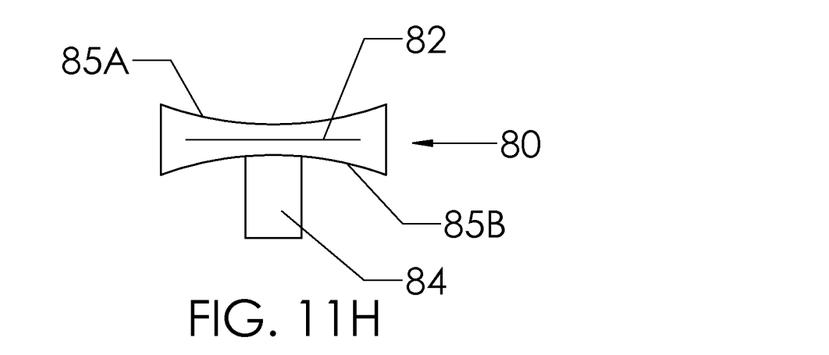
Figure 11I:
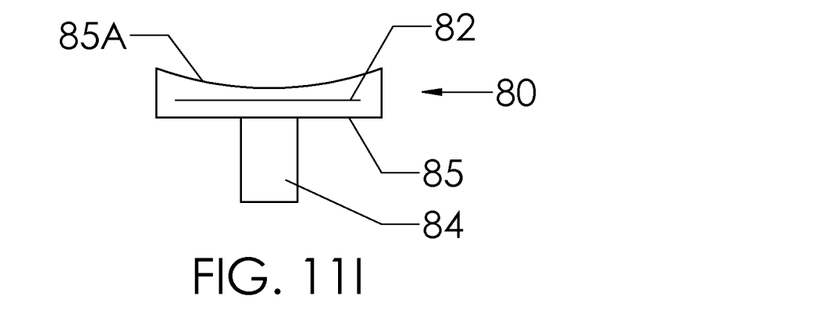
Figure 11J:
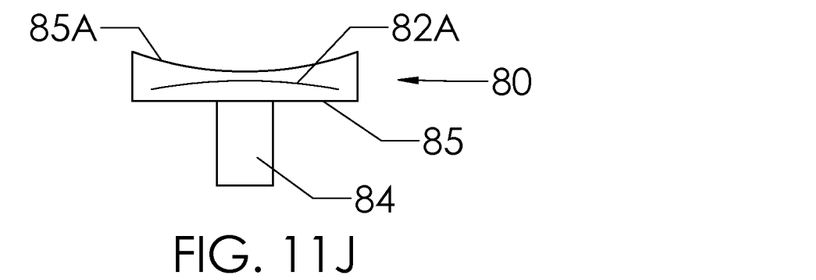

Providing for increased friction, resistance, support, and material between the top and bottom surfaces of each device is also accomplished by providing top elements with select areas that are thicker than the remaining areas of the top element by changing the shape of the surface. For example, the otherwise planar top or bottom surface can be molded to be convex or concave producing areas of greater and lesser thicknesses. FIGS. 11E and 11F illustrates an anchor 80 having top element 81 with downward extending extension 84 emanating from bottom surface 85b. Top element 81 is made thicker about the edges and thinner in the middle by have the central area of the bottom surface compressed. FIG. 11G illustrates anchor 80 having top element 81 thicker about the edges and thinner in the middle by have the central area of the top 85A and bottom 85b surfaces compressed into the element. This anchor has exceptional strength as embedded high-strength material 82A mimics the shape of the compressed bottom surface. FIG. 11H illustrates an anchor 80 having top element 81 thicker about the edges and thinner in the middle by have the central area of the top 85A and bottom 85b surfaces compressed but with embedded high-strength material 82 planar. FIG. 11I illustrates an anchor 80 having top element 81 made thicker about the edges and thinner in the middle by have the central area of top surface 85A compressed with embedded high-strength material 82 maintaining its planarity. FIG. 11J illustrates an anchor 80 having top element 81 thicker about the edges and thinner in the middle by have the central area of the top surface 85A and bottom surface 85b compressed towards each other with embedded high-strength material 82A mimicking the shape of a compressed bottom surface. Anchors made of a resilient plastic with areas of greater and lesser thicknesses makes this construction work in many instances where more rigid (rigid plastic or metal) anchors are prone to failure. For example, when the deck board material contracts, the slot spaces can increase and the resilient areas of greater thickness of the anchors expand to fill the increased space and add support as well as maintaining high-friction surfaces. Alternatively, when the slots are grooved into "wet" boards, the slots often shrink during the time it takes for the boards to be milled, stored, and delivered to a jobsite, thus requiring anchors that are resilient enough to compress to provide for insertion into the decreased sized slot. The areas of greater and lesser thicknesses made according to the principles of the invention will compress to fit into such narrow slots. One embodiment has a slight raised ridge along the outer side of the top element (FIG. 2) to concentrate the hold-down force as deep in the slot as possible to help keep the boards from cupping. No slot is machined perfectly flat as seen in drawings, so the raised edge makes sure the hold down force is as deep in the groove as possible. When the board slots are larger than intended, the areas of greater thickness of the anchors of the present invention will remain in contact with the surfaces of the slot to create a resistance between the board and the anchor to keep both the board and the anchor in place and will do this without damaging the boards. When the board slots are smaller than intended, the resilient plastic anchors can be pushed into the slot without any fear of the anchors cutting into, or in any other way, damaging the deck board.

Figure 12A:
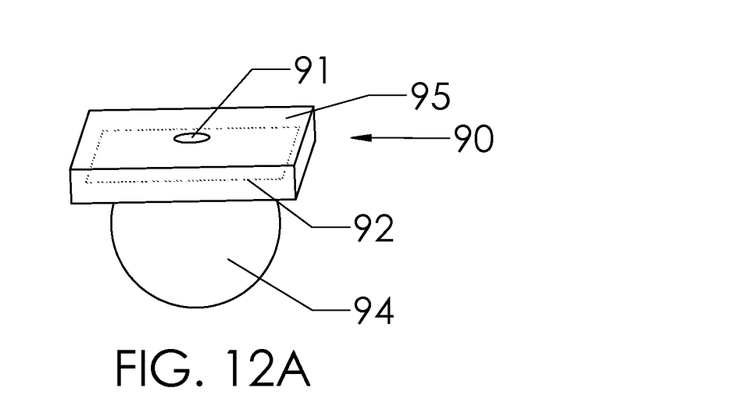
FIG. 12A is a perspective view of a further anchoring device of the invention.
Figure 12B:
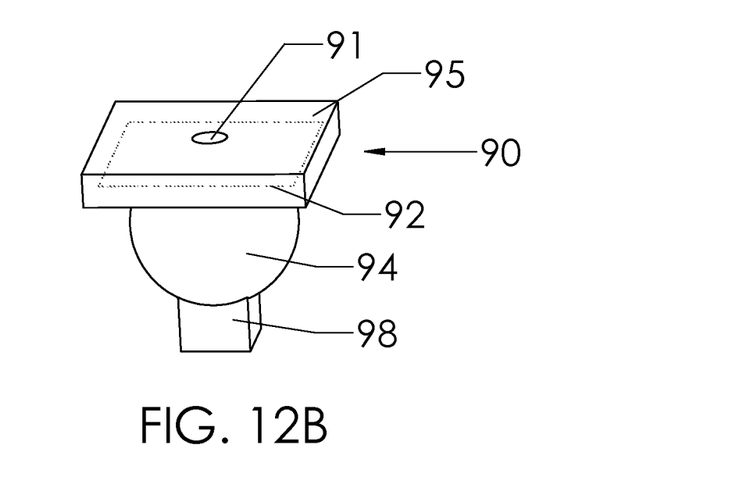
FIG. 12B is a perspective view of another further anchoring device of the invention.

FIG. 12A illustrates a perspective view of an embodiment of the anchoring device following the inventive concept taught herein with anchor 90 having generally rectilinear top element 95 and embedded high-strength material being indicated by the dotted line 92. Fastening opening 91 is arranged about center of the top element with spherical downward extending element 94 extending downwardly from the underside of top element 93. Although not shown, spherical downward extending element 94 may or may not be impregnated with a high-strength material in either a solid or a particulate form. The width made possible by the spherical shape and the strength of element 94 enables element 94 to contribute to the anchor's ability to maintain the boards in the desired spaced position. When the diameter of the spheroidal element would be too large for the desired spacing between the boards, but reducing the diameter of the spheroidal element would decrease its height which would reduce the height of the top element that is supported by the spheroidal element, the spheroidal element is supported by support base 98 to increase the height of the top element as illustrated in FIG. 12A.

Thus it has been shown that Applicant devised a set of inventive principles that provide for an anchor that offers resiliency, strength, and a high friction non-slip surface that include embedding a high-strength material within an anchor body of flexible, resilient material. The high-strength material is embedded into the resilient body during the molding process used to manufacture the anchor to maintain the strength of the anchor regardless of either temperature or moisture changes and/or the amount of stress applied to the fastener while, for example, an installer works to straighten each deck board. Additionally, the flexible resilient body of Applicant's anchor provides the cushioning required for absorption of stresses induced by repeated seasonal or diurnal expansion and contraction of the decking boards and/or worker or user induced stresses. While the flexible body of Applicant's fastener absorbs the stresses, the high-strength insert limits the deleterious effects of the deck board on the anchor preventing crushing or damaging of the anchor during and after installation. Therefore, Applicant's anchor more consistently and for longer times maintains a desired gap space between fastened deck boards both during and after installation.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. An anchoring device comprising:
   an anchor that anchors adjacent spaced boards to each other and to a support, comprising:
   a generally horizontal top element of varying thicknesses,
      said top element made of a bendable first resilient material having a core component of a second different material,
      said top element sized and shaped to fit into a joining slot of a laid board, and having at least one element generally extending downwardly from the underside thereof, and
   a fastening aperture through said top element and said at least one element generally extending downwardly.

2. The anchoring device of claim 1 wherein said at least one element generally extending downwardly further comprises a spherical shape made from the first resilient material having the second material embedded therein.

3. The anchoring device of claim 1 wherein said varying thicknesses of said top element comprise protuberances extending from a top, bottom, side surface of said top element or a combination thereof, where said protuberance height is determined by the height of the joining slot and the resiliency of the protuberance.

4. The anchoring device of claim 3 wherein said varying thicknesses of said top element comprise said top element molded to have thicker and thinner sections.

5. An anchoring device comprising:
   an anchor that anchors adjacent spaced boards to each other and to a support, comprising:
   a generally planar horizontal top element with areas of varying thicknesses of a bendable first resilient material having a second different material embedded therein and sized and shaped to fit into a joining slot of a laid board,
   at least one element generally extending downwardly from the underside of said top element, with
   a fastening aperture generally extending downwardly through said top element and said at least one element.

6. The anchoring device of claim 5 wherein said fastening aperture is sized to provide resistance to the passage of a head of a fastening element.

7. The anchoring device of claim 5 wherein said varying thicknesses of said top element comprise protuberances or alternately where said varying thicknesses of said top element comprise said top element molded to have thicker and thinner sections.

8. The anchoring device of claim 7 wherein said second material is a solid.

9. The anchoring device of claim 8 wherein said embedded second material is a metal.

10. The anchoring device of claim 8 wherein said embedded second material is a plastic.

11. The anchoring device of claim 8 wherein said embedded second material is a fiberglass.

12. The anchoring device of claim 5 wherein said embedded second material is in particulate form.

13. An anchoring device comprising:
   an anchor that anchors adjacent spaced boards to each other and to a support, comprising
   a generally horizontal top element comprising areas of varying thicknesses, said top element made of a first bendable resilient material having at least one of a solid and particulate second material embedded in the generally horizontal top element that is sized and shaped to fit into a joining slot of a laid board, at least one element extending downwardly from the underside of said top element, with a central axis generally coinciding with a central axis of a fastening aperture therethrough.

14. The anchoring device of claim 13 wherein said fastening aperture therethrough is sized to provide resistance to the passage of a head of a fastening element.

15. The anchoring device of claim 13 wherein said varying thicknesses of said top element comprise protuberances or alternately where said varying thicknesses of said top element comprise said top element molded to have thicker and thinner sections.

16. The anchoring device of claim 13 wherein said embedded second material is a metal.

17. The anchoring device of claim 13 wherein said embedded second material is a plastic.

18. The anchoring device of claim 13 wherein said downward extending element comprises a spherical shape.

19. The anchoring device of claim 13 wherein said embedded second material is a fiberglass.

20. The anchoring device of claim 13 wherein said top element and said downward extending element further comprise at least one of a solid and particulate material embedded therein.

* * * * *